United States Patent [19]

Elber

[11] 4,330,100
[45] May 18, 1982

[54] MEANS FOR CONTROLLING AERODYNAMICALLY INDUCED TWIST

[75] Inventor: Wolf Elber, Newport News, Va.

[73] Assignee: The United States of America as represented by the Administrator of the National Aeronautics and Space Administration, Washington, D.C.

[21] Appl. No.: 79,913

[22] Filed: Sep. 28, 1979

[51] Int. Cl.³ .............................................. B64C 3/52
[52] U.S. Cl. ...................................................... 244/48
[58] Field of Search ............... 244/46, 48, 35 R, 90 R, 244/201, 219, 123; 416/132 R, 138 A

[56] References Cited

U.S. PATENT DOCUMENTS

| | | | |
|---|---|---|---|
| 1,145,013 | 7/1915 | Gallaudet | 244/48 |
| 2,749,061 | 6/1956 | Franz | 244/123 |
| 3,599,904 | 8/1971 | Condit et al. | 244/48 |
| 3,870,253 | 3/1975 | Leidy et al. | 244/48 |
| 3,883,093 | 5/1975 | Vlolleau | 244/215 |

FOREIGN PATENT DOCUMENTS 752142 9/1933 France ........................ 416/132 R

*Primary Examiner*—Charles E. Frankfort
*Attorney, Agent, or Firm*—Wallace J. Nelson; John R. Manning; Howard J. Osborn

[57] ABSTRACT

A wing twist deformation control mechanism which provides active compensation for aerodynamically induced twist deformation of high aspect ratio wings. The twist deformation control mechanism consists of a torque tube, internal to each wing and rigidly attached near the tip of each wing, and moved by an actuator located in the aircraft fuselage. As changes in the aerodynamic loads on the wings occur the torque tube is rotated to compensate for the induced wing twist.

2 Claims, 4 Drawing Figures

MEANS FOR CONTROLLING AERODYNAMICALLY INDUCED TWIST

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The aerodynamic load on aircraft wings will vary due to such factors as increased lift with changes in airspeed, cargo loading in the aircraft, and flap setting. Aircraft wings, particularly aircraft with high aspect ratios, are subjected to bending deformation and twist deformation of the wings as the aerodynamic load on the wings vary.

The twist deformation can cause serious degradation in aerodynamic performance. Since the center of lift of the wing is located behind the center of torsion, as lift on the wing increases, the leading edge of the wing will twist down. This decreases the angle of attack of the wing and reduces its efficiency. As the angle of attack is decreased the outer edge of the wing twists downward due to aerodynamic forces and causes the wing to flex downward.

DESCRIPTION OF THE PRIOR ART

To compensate for the problem of aerodynamically induced twist deformation, manufacturers have tried several passive solutions. One such solution has been to build a counter twist into the wing structure. Thus, in this type wing, as the wing is loaded, twist deformation will cause the wing to twist to the optimum angle of attack. This is a medium type compromise since the wing will be at the optimum angle only at one particular loading and will be greater than the optimum or less than the optimum for other loadings.

Another solution currently applied to control aerodynamically induced twist deformations has been the use of composite materials such that the wing has non-isotropic properties, that is, the wing will be relatively stiff in torsion, but still flexible in bending. An example of this type of construction might have the skin of the wing constructed of a composite material and the wing structural members constructed of metal. This would provide a wing that resists changes in torsion. While this type of wing will help control the problem it is still a passive system and cannot be varied in flight to achieve optimum twist.

It is therefore an object of the present invention to provide an aircraft wing twist control mechanism that may be actively varied during flight to achieve optimum wing twist under various aerodynamic wing loading conditions.

An additional object of the present invention is to provide apparatus for controlling aerodynamically induced wing twist that is light in weight and useful in powered and glider aircraft.

SUMMARY OF THE INVENTION

According to the present invention, the foregoing and other objects are attained by providing a torque tube in each wing, internal to the wing, rigidly attached at one end to a structural member near the wing tip, and attached on the other end, to an actuator mounted in the aircraft fuselage. The actuator is used to rotate the torque tube, causing the wing tips to rotate, thereby varying the twist in the wing since the wing root is rigidly attached to the fuselage.

BRIEF DESCRIPTION OF THE DRAWINGS

A more complete appreciation of the invention and many of the attendant advantages thereof will be more readily apparent by reference to the following detailed description when considered in connection with the accompanying drawings wherein.

DESCRIPTION OF THE PREFERRED EMBODIMENT

Figure 1:
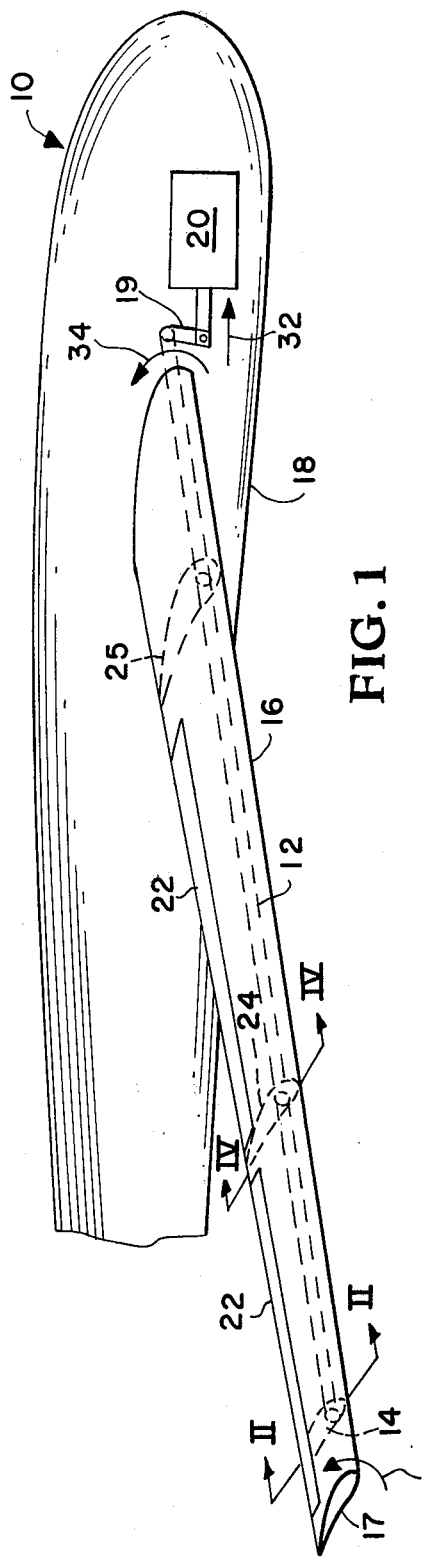
FIG. 1 is a perspective of an aircraft according to the present invention.

Referring now to the drawings and more particularly to FIG. 1, there is illustrated a preferred embodiment of the present invention as it would be used in an aircraft designated generally by the numeral 10. FIG. 1 illustrates only the right wing 16 of the aircraft 10, however, the left wing would be of identical construction.

Torque tube 12 runs the length of wing 16 and is attached at its outer end to structural member 14 near the wing tip 17. In the preferred embodiment the torque tube is a graphite/epoxy composite, although other materials may be used. Suitable graphite/epoxy tubular members which may be employed as torque tubes 12 are disclosed for example in copending application Ser. No. 811,401 filed June 29, 1977 and assigned to the National Aeronautics and Space Administration (NASA Case No. LAR 12095-1). These torque tubes may be of uniform diameter or tapered but in the preferred form would be of uniform diameter. The wall thickness of the tubular torque members 12 is not considered critical and in the preferred embodiment is uniform along the length thereof. This wall thickness may be increased or decreased depending upon the strength and torque required for torquing the wings of the aircraft employing the invention. The inboard end of torque tube 12 is rigidly secured to arm 19 leading to and pivotally attached to suitable actuator mechanism 20, located in the fuselage 18. Actuator mechanism 20 is of conventional construction for aircraft controls and may be mechanical, electrical, pneumatic, hydraulic or the like for rotative movement of arm 19. In the preferred embodiment, actuator 20 would be an electrically actuated solenoid. Torque tube 12 passes slidably through, but is not rigidly attached to wing structural members 24 and 25 as will be further explained hereafter.

Figure 2:
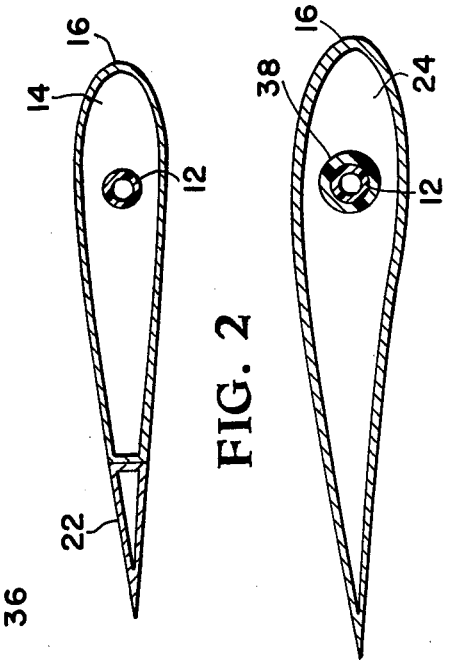
FIG. 2 is a sectional view of the aircraft wing taken along line II—II, of FIG. 1.

Referring now more particularly to FIG. 2, wing 16 is schematically shown as seen along line II—II of FIG. 1. Torque tube 12 is rigidly attached to wing structural member or spar 14 by conventional means. In the preferred embodiment torque tube 12 is attached to wing spar 14 by adhesively bonding the composite tube to the metal structural member 14 and structural member 14 is of adequate thickness to maintain this bond.

Figure 3:
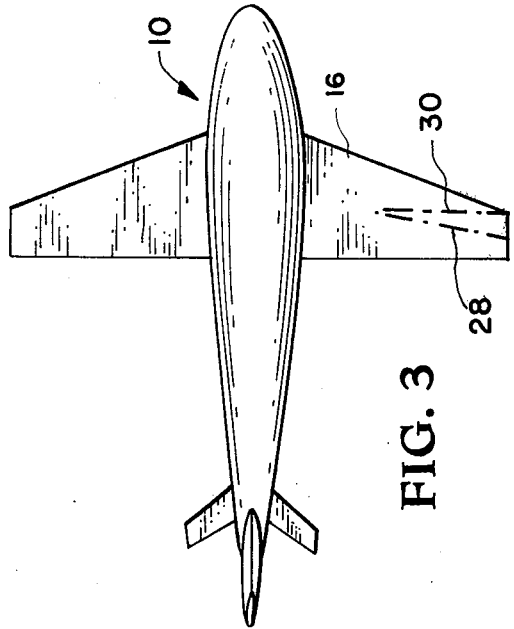
FIG. 3 is a top view of the aircraft shown in FIG. 1.

FIG. 3 shows the relative position of the lift axis 28 and the twist axis 30.

In operation, the aerodynamic load on aircraft wing 16 will change due to factors such as flap 22 setting, speed of the aircraft 10 and cargo load. As the aerodynamic load increases, wing 16 will twist forward, since the lift axis 28 is aft the twist axis 30. This causes the leading edge of wing 16 to twist downward. To compensate for this downward twisting, actuator 20 located in fuselage 18, is controlled by the pilot to move arm 19 in the direction of arrow 32 and thereby cause torque tube 14 to rotate in the direction shown by arrow 34. Also, actuator mechanism 20 could be designed to automatically respond to signals representing airspeed, flap setting and wing loading. The rotation of torque tube 12 causes wing tip 17 to rotate in a direction shown by arrow 36. This will raise the leading edge of wing 16 and compensate for the increase in aerodynamic loading.

Figure 4:
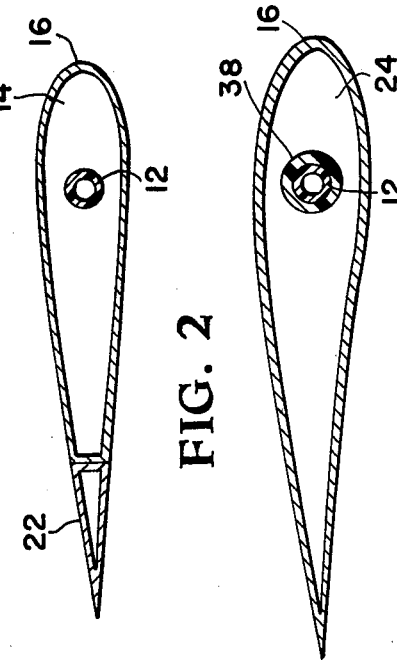
FIG. 4 is a sectional view of the wing of the aircraft shown in FIG. 1 and taken along line IV—IV thereof.

In the preferred embodiment torque tube 12 is attached to intermediate support member 24 by elastic support 38 (FIG. 4) to equalize twist distribution. In a specific embodiment neoprene is the preferred material for elastic support 38 which frictionally retains torque tube 12 therethrough.

It is thus seen that the wing twist mechanism described in the present invention permits the design of a more flexible wing structure thus making the aircraft lighter in weight. Also, using the mechanism described in the present invention, wing twist can be varied by the pilot during flight, allowing the wing to be twisted to the optimum position for various flight conditions.

It will be understood that the foregoing description is of the preferred embodiments of the invention and is therefore merely representative. Obviously, there are many variations and modifications of the present invention in light of the above teachings that will be readily apparent to those skilled in the art. It is therefore understood that within the scope of the appended claims the invention may be practiced otherwise than as specifically described.

What is claimed as new and desired to be secured by Letters Patent of the United States is:

1. An aircraft having a wing twist mechanism comprised of a single torque tube disposed internal to each of the wings attached to the aircraft fuselage, each said torque tube having an inboard end and an outboard end, said torque tubes being rigidly attached to wing structural members near the tip of each wing at the outboard end thereof, and an actuator attaching the inboard end of each said torque tube to the aircraft fuselage, said actuator comprising an electrically actuated solenoid, said solenoid being attached to a rotatable arm member and said arm member being secured to said torque tube, and means for elastically attaching said torque tube to wing structural support members at intermediate wing positions, whereby adjustment of the actuator will activate said solenoid and rotate said arm member and induce twist in the aircraft wings via said torque tubes.

2. Means for controlling aerodynamically induced twist in an aircraft wing comprising in combination with an aircraft having a fuselage and a pair of wings attached to the fuselage;

a torque tube having a root end and a tip end and disposed internal of and extending substantially the entire length of each aircraft wing, said torque tube being rigidly secured at the tip end thereof to a wing structural member adjacent the wing tip, said torque tube being also attached at the root end thereof to a pilot controlled actuator mechanism disposed in the aircraft fuselage, and elastic connection means disposed along the length of said torque tube for elastically attaching said torque tube to structural support members disposed in said wing, said torque tube being constructed of a graphite/epoxy composite material wherein the graphite is in the form of graphite fibers extending the length of said tube and said torque tube being of uniform diameter and wall thickness along the entire length thereof, whereby during aircraft flight said actuator mechanism is activated by the aircraft pilot to rotate said torque tube to cause wing twist in an opposite direction of and to thereby nullify the inherently aerodynamically induced twist occuring in said wing during flight and thereby maintain optimum aircraft flight.

* * * * *